US012095235B2

(12) United States Patent
Tsumagari et al.

(10) Patent No.: US 12,095,235 B2
(45) Date of Patent: Sep. 17, 2024

(54) SPARK PLUG

(71) Applicant: NITERRA CO., LTD., Aichi (JP)

(72) Inventors: Shoma Tsumagari, Aichi (JP); Haruki Yoshida, Aichi (JP); Hiroki Shimada, Aichi (JP); Tomoya Kukino, Aichi (JP); Takuto Koba, Aichi (JP); Noriyuki Tamura, Aichi (JP)

(73) Assignee: Niterra Co., Ltd., Nagoya (JP)

( * ) Notice: Subject to any disclaimer, the term of this patent is extended or adjusted under 35 U.S.C. 154(b) by 0 days.

(21) Appl. No.: 18/567,558

(22) PCT Filed: Jun. 14, 2022

(86) PCT No.: PCT/JP2022/023733
§ 371 (c)(1),
(2) Date: Dec. 6, 2023

(87) PCT Pub. No.: WO2022/264997
PCT Pub. Date: Dec. 22, 2022

(65) Prior Publication Data
US 2024/0275138 A1 Aug. 15, 2024

(30) Foreign Application Priority Data
Jun. 14, 2021 (JP) ................................ 2021-098896

(51) Int. Cl.
*H01T 13/38* (2006.01)

(52) U.S. Cl.
CPC .................................. *H01T 13/38* (2013.01)

(58) Field of Classification Search
CPC ............................... H01T 13/38; H01T 13/22
See application file for complete search history.

(56) References Cited

U.S. PATENT DOCUMENTS 8,148,883 B2 4/2012 Honda et al.
10,348,061 B2 7/2019 Yamada et al.
(Continued)

FOREIGN PATENT DOCUMENTS

JP 2007-250379 A 9/2007
JP 2019-9053 A 1/2019
JP 2020-57559 A 4/2020

OTHER PUBLICATIONS

International Search Report from corresponding International Patent Application No. PCT/JP2022/023733, dated Aug. 30, 2022.

*Primary Examiner* — Anne M Hines
(74) *Attorney, Agent, or Firm* — KUSNER & JAFFE

(57) ABSTRACT

In a spark plug 1 of the present invention, in a mirror-polished surface **230*a* obtained by mirror-polishing a cut surface 230 obtained by cutting an insulator 2 in a direction perpendicular to an axial line AX direction, at a position separated by 2 mm from a portion having a maximum diameter of a diameter-enlarged portion 31*a* to a rear end side along the axial line AX direction, when 20 first observation regions X each being 192 μm×255 μm are set so as to each overlap a reference position m1 being a position 0.2 mm in a radial direction from an inner peripheral surface 2*a* side of the insulator 2 and so as not to overlap each other, a proportion (porosity) of an area of all of pores included in the 20 first observation regions X relative to a total area (100%) of the 20 first observation regions X is not greater than 3.5%, and in a thermally etched surface 230*b* obtained by subjecting the mirror-polished surface 230*a* to thermal etching, when 20 second observation regions Y each being 32 μm×43 μm are set so as to each overlap the reference position m1** and so as not to overlap each other, a particle size distribution of alumina particles included in the 20 second observation regions Y is regarded as a normal distribution, an average particle diameter of the alumina
(Continued)

particles is defined as A, and a standard deviation of a particle diameter of the alumina particles is defined as σ, A is not less than 1.9 μm and not greater than 2.8 μm, and (A+3σ) is not greater than 3.0 μm.

4 Claims, 7 Drawing Sheets

(56) References Cited

U.S. PATENT DOCUMENTS

| | | | | |
|---|---|---|---|---|
| 11,183,819 | B2 | 11/2021 | Yokoyama et al. | |
| 2007/0228915 | A1 | 10/2007 | Honda et al. | |
| 2018/0375299 | A1 | 12/2018 | Yamada et al. | |
| 2019/0229501 | A1 * | 7/2019 | Niessner | H01T 13/39 |
| 2020/0112146 | A1 | 4/2020 | Yokoyama et al. | |
| 2021/0320480 | A1 * | 10/2021 | Saito | H01T 21/02 |

* cited by examiner

SPARK PLUG

FIELD OF THE INVENTION

The present invention relates to a spark plug.

BACKGROUND OF THE INVENTION

A spark plug used in an internal combustion engine includes: an insulator having a tubular shape and made from an alumina-based sintered body mainly composed of alumina; and a center electrode housed inside the insulator (e.g., Patent Document 1). The center electrode includes: an electrode body portion (electrode leg portion) having a bar-like shape of which the front end is exposed from the insulator and of which the rear end is housed inside the insulator; and a diameter-enlarged portion (electrode flange portion) continuous to the rear end of the electrode body portion. The diameter-enlarged portion has a shape enlarged in the radial direction from the electrode body portion, and in a state where such a diameter-enlarged portion is engaged with a portion bulged in a stepped manner at the inner wall of the insulator, the center electrode is housed inside the insulator. To the rear end of the diameter-enlarged portion, an electrode head portion having a smaller diameter than the diameter-enlarged portion is connected.

In a state where the center electrode is housed inside the insulator, a portion (i.e., the diameter-enlarged portion and the electrode head portion) on the rear end side of the center electrode and the inner wall of the insulator are opposed to each other while keeping an interval with each other in the radial direction. While filling the space therebetween and in a form of covering the rear end of the center electrode, a conductive seal member is provided inside the insulator. The seal member is made from a conductive composition that contains glass particles of a $B_2O_3$—$SiO_2$-based material or the like and metal particles (Cu, Fe, etc.), for example.

Patent Document 1: Japanese Unexamined Patent Application Publication No. 2020-57559

At the above-described place where the portion on the rear end side of the center electrode and the inner wall of the insulator are opposed to each other in the radial direction, heat having moved from the front end side to the rear end side of the center electrode during use of a spark plug easily accumulates, and in addition, electric fields are easily concentrated when a high voltage is applied to the center electrode. In the rear end side of the center electrode, particularly at the place where the diameter-enlarged portion having a shape enlarged in the radial direction is opposed to the inner wall of the insulator in the radial direction, the space is smaller, and heat concentration and electric field concentration easily occur. Therefore, in the insulator, particularly the portion opposed to the diameter-enlarged portion of the center electrode in the radial direction can be said to be in a harshest environment.

Under such a circumstance and the like, provision of a spark plug including an insulator excellent in the withstand voltage performance and the like has been desired.

SUMMARY OF THE INVENTION

An object of the present invention is to provide a spark plug including an insulator excellent in the withstand voltage performance and the like.

The present inventors found the following. That is, in a spark plug including an insulator made from an alumina-based sintered body and a center electrode housed inside the insulator, if an alumina particle having undergone abnormal grain growth and having a certain size or greater is present inside a specific place in a middle trunk portion of the insulator, electric fields are easily concentrated around the alumina particle when a high voltage is applied to the center electrode, and the vicinity of the alumina particle serves as a start point of breakage of the insulator.

Then, the present inventors conducted thorough studies in order to attain the above object, and found that, inside the specific place in the middle trunk portion of the insulator, when the average particle diameter of alumina particles forming the sintered body is in a predetermined range where the average particle diameter is not a particle diameter at abnormal grain growth, and variation in the particle diameter of the alumina particles is suppressed, the withstand voltage performance and the like of the insulator is ensured. Then, the present inventors completed the invention of the present application.

The means for solving the above problems are as follows. That is,

<1> A spark plug including: an insulator having a tubular shape extending along an axial line direction thereof and made from an alumina-based sintered body; a center electrode including an electrode body portion having a bar-like shape inserted in the insulator such that a front end of the electrode body portion is exposed from the insulator and a rear end of the electrode body portion is housed inside the insulator, and a diameter-enlarged portion continuous to the rear end of the electrode body portion, having a shape enlarged in a radial direction from the electrode body portion, and engaged with an inner wall of the insulator; and a conductive sealing material housed inside the insulator and provided on the rear end side of the center electrode, wherein in a mirror-polished surface obtained by mirror-polishing a cut surface obtained by cutting the insulator in a direction perpendicular to the axial line direction, at a position separated by 2 mm from a portion having a maximum diameter of the diameter-enlarged portion to the rear end side along the axial line direction, when 20 first observation regions each being 192 μm×255 μm are set so as to each overlap a reference position being a position 0.2 mm in the radial direction from an inner peripheral surface side of the insulator and so as not to overlap each other, a proportion (porosity) of an area of all of pores included in the 20 first observation regions relative to a total area (100%) of the 20 first observation regions is not greater than 3.5%, and in a thermally etched surface obtained by subjecting the mirror-polished surface to thermal etching, when 20 second observation regions each being 32 μm×43 μm are set so as to each overlap the reference position and so as not to overlap each other, a particle size distribution of alumina particles included in the 20 second observation regions is regarded as a normal distribution, an average particle diameter of the alumina particles is defined as A, and a standard deviation of a particle diameter of the alumina particles is defined as σ, A is not less than 1.9 μm and not greater than 2.8 μm, and (A+3σ) is not greater than 3.0 μm.

<2> The spark plug according to <1> above, wherein, in the 20 second observation regions in the thermally etched surface, when top three alumina particles having the largest long diameters are selected for each second observation region, to select 60 representative alumina particles having large long diameters, a frequency distribution of an aspect ratio of the representative alumina particles is regarded as a normal distribution, an average aspect ratio of the representative alumina particles is defined as B, and a standard deviation of the aspect ratio of the representative alumina particles is defined as σ, (B+3σ) is not greater than 4.8.

<3> The spark plug according to <2> above, wherein, in the 20 second observation regions in the thermally etched surface, out of the representative alumina particles, the number of representative alumina particles of which the aspect ratio is not less than 3.5 is not greater than two.

4> The spark plug according to any one of <1> to <3> above, wherein, in the 20 first observation regions in the mirror-polished surface, the number of the pores is not greater than 600.

According to the present invention, a spark plug including an insulator excellent in the withstand voltage performance and the like can be provided.

DETAILED DESCRIPTION OF THE INVENTION

First Embodiment

Figure 1:
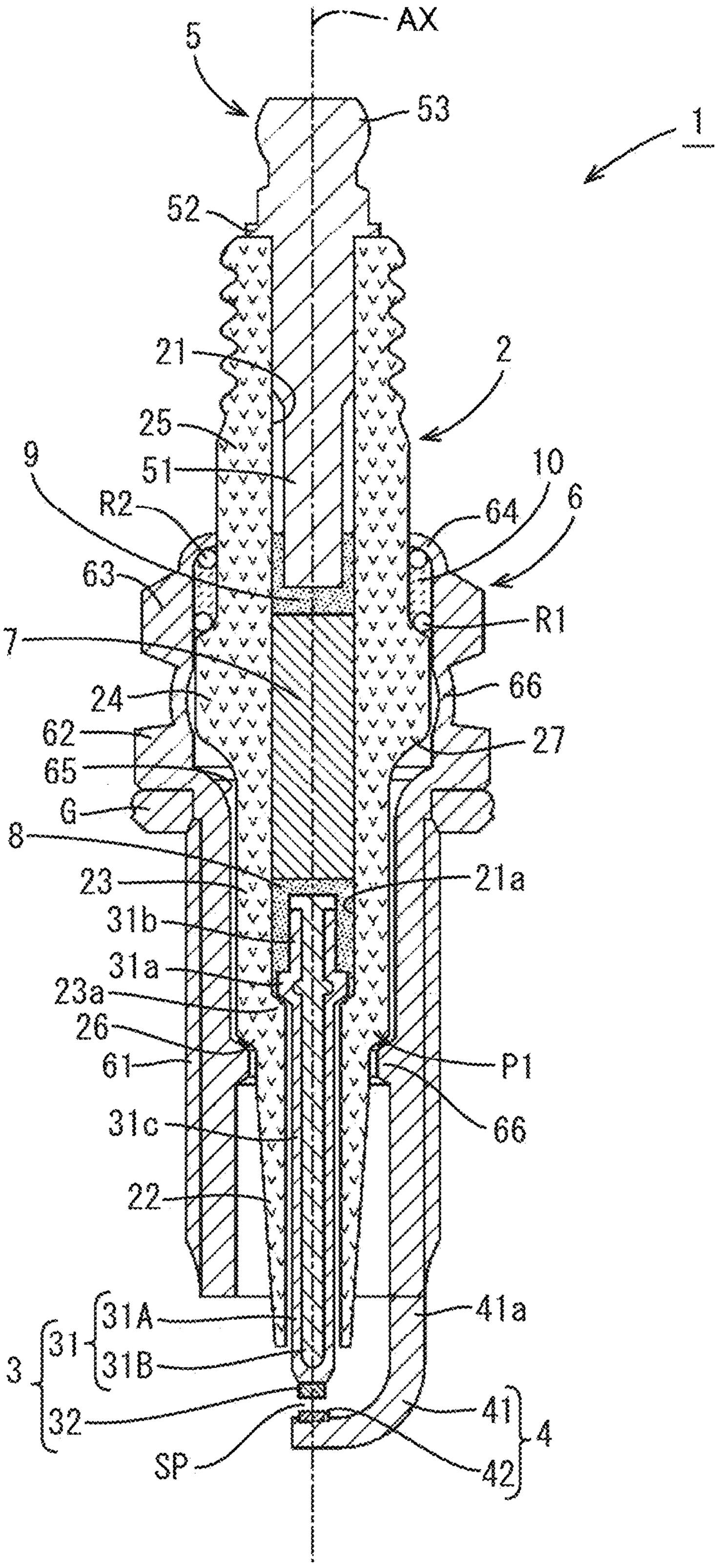
FIG. 1 is a sectional view along an axial line direction of a spark plug according to a first embodiment.

A spark plug 1 according to a first embodiment of the present invention will be described with reference to FIG. 1 to FIG. 6. FIG. 1 is a sectional view along an axial line AX direction of the spark plug 1 according to the first embodiment. An alternate long and short dash line extending in the up-down direction shown in FIG. 1 is an axial line AX of the spark plug 1. In FIG. 1, the longitudinal direction (the axial line AX direction) of the spark plug 1 corresponds to the up-down direction in FIG. 1. On the lower side in FIG. 1, the front end side of the spark plug 1 is shown, and on the upper side in FIG. 1, the rear end side of the spark plug 1 is shown.

The spark plug 1 is mounted to an engine (an example of an internal combustion engine) of an automobile, and is used for ignition of an air-fuel mixture in a combustion chamber of the engine. The spark plug 1 mainly includes an insulator 2, a center electrode 3, a ground electrode 4, a metal terminal 5, a metal shell 6, a resistor 7, and seal members 8, 9.

The insulator 2 is a substantially cylindrical member extending in the axial line AX direction and including a through-hole 21 therein. Details of the insulator 2 will be described later.

The metal shell 6 is a member used when mounting the spark plug 1 to the engine (specifically, an engine head), has, as a whole, a cylindrical shape extending in the axial line AX direction, and is formed from a conductive metal material (e.g., low-carbon steel material). At the outer peripheral surface on the front end side of the metal shell 6, a screw portion 61 is formed. A ring-shaped gasket G is externally fitted on the rear end (a so-called thread root) of the screw portion 61. The gasket G has an annular shape, and is formed by bending a metal plate. The gasket G is disposed between the rear end of the screw portion 61 and a seat portion 62 provided on the rear end side relative to the screw portion 61, and seals a space formed between the spark plug 1 and the engine (engine head) when the spark plug 1 is mounted to the engine.

A tool engagement portion 63 for engaging a tool such as a wrench when mounting the metal shell 6 to the engine is provided on the rear end side of the metal shell 6. A thin crimping portion 64 bent to the radially inner side is provided in a rear end portion of the metal shell 6.

The metal shell 6 includes therein an insertion hole 65 penetrating in the axial line AX direction, and, in a form of being inserted through the insertion hole 65, the insulator 2 is held inside the metal shell 6. The rear end of the insulator 2 is in a state of protruding to a large extent from the rear end of the metal shell 6 to the outer side (the upper side in FIG. 1). In contrast to this, the front end of the insulator 2 is in a state of slightly protruding from the front end of the metal shell 6 to the outer side (the lower side in FIG. 1).

Between the inner peripheral surface of the portion from the tool engagement portion 63 to the crimping portion 64 of the metal shell 6 and the outer peripheral surface (the outer peripheral surface of a rear-side tube portion 25 described later) of the insulator 2, a region having an annular shape is formed, and in the region, a first ring member R1 and a second ring member R2 each having an annular shape are disposed in a state of being separated from each other in the axial line AX direction. Powder of a talc 10 is filled between the first ring member R1 and the second ring member R2. The rear end of the crimping portion 64 is bent to the radially inner side, and is fixed to the outer peripheral surface (the outer peripheral surface of the rear-side tube portion 25 described later) of the insulator 2.

The metal shell 6 includes a thin compressive deformation portion 66 provided between the seat portion 62 and the tool engagement portion 63. During manufacture of the spark plug 1, the compressive deformation portion 66 is compressively deformed by the crimping portion 64, which is fixed to the outer peripheral surface of the insulator 2, being pressed to the front end side. Due to the compressive deformation of the compressive deformation portion 66, the insulator 2 is pressed to the front end side in the metal shell 6 through the first ring member R1, the second ring member R2, and the talc 10. At that time, the outer peripheral surface of a portion (a first diameter-enlarged portion 26 described later), which is a part of the insulator 2, enlarged in an annular shape to the outer side is pressed against, with a packing P1 interposed, the surface of a step portion 66 provided on the inner periphery side of the metal shell 6. Therefore, even when gas in the combustion chamber of the engine enters a space formed between the metal shell 6 and the insulator 2, the gas is prevented from leaking out to the outside by the packing P1 provided in the space.

In a state where the insulator 2 is mounted inside the metal shell 6, the center electrode 3 is provided inside the insulator 2. The center electrode 3 includes: a bar-like center electrode body 31 extending along the axial line AX direction; and a substantially columnar (substantially disc-shaped) tip (center electrode tip) 32 mounted to the front end of the center electrode body 31. The center electrode body 31 is a member having a length shorter in the longitudinal direction than those of the insulator 2 and the metal shell 6, and is held in the through-hole 21 of the insulator 2 such that the front end side of the center electrode body 31 is exposed to the outside. The rear end of the center electrode body 31 is housed inside (the through-hole 21) of the insulator 2. The center electrode body 31 includes an electrode base material 31A provided on the outer side, and a core portion 31B embedded in the electrode base material 31A. The electrode base material 31A is formed by using, for example, nickel or an alloy (e.g., NCF600, NCF601) mainly composed of nickel. The core portion 31B is formed from copper or a nickel-based alloy mainly composed of copper, which is excellent in thermal conductivity when compared with the alloy forming the electrode base material 31A.

The center electrode body 31 includes: an electrode flange portion 31*a* mounted to a predetermined position in the axial line AX direction; an electrode head portion 31*b*, which is a portion on the rear end side relative to the electrode flange portion 31*a*; and an electrode leg portion 31*c*, which is a portion on the front end side relative to the electrode flange portion 31*a*. The electrode leg portion (an example of an electrode body portion) 31*c* is a bar-like member inserted in the through-hole 21 of the insulator 2 such that the front end of the bar-like member is exposed from the insulator 2 and the rear end of the bar-like member is housed inside the insulator. The electrode flange portion (an example of a diameter-enlarged portion) 31*a* is continuous to the rear end of the electrode leg portion (electrode body portion) 31*c*, and has a shape enlarged in the radial direction from the electrode leg portion 31*c*. In a state of being housed in the insulator 2, the electrode flange portion 31*a* is engaged with a step portion 23*a* (described later) formed at an inner wall 21*a* of the insulator 2. The front end (i.e., the front end of the center electrode body 31) of the electrode leg portion 31*c* protrudes to the front end side relative to the front end of the insulator 2. The electrode flange portion 31*a* is a bar-like portion shorter than the electrode leg portion 31*c*, and has a smaller diameter than the electrode flange portion 31*a*.

The tip 32 has a substantially columnar shape (substantially disc shape), and is joined to the front end (the front end of the electrode leg portion 31*c*) of the center electrode body 31 by resistance welding, laser welding, or the like. The tip 32 is made from a material (e.g., an iridium-based alloy mainly composed of iridium (Ir)) mainly composed of a noble metal having a high melting point.

The metal terminal 5 is a bar-like member extending in the axial line AX direction, and is mounted in a form of being inserted to the rear end side of the through-hole 21 of the insulator 2. The metal terminal 5 is disposed to the rear end side relative to the center electrode 3, in the insulator 2 (the through-hole 21). The metal terminal 5 is formed from a conductive metal material (e.g., low-carbon steel). The surface of the metal terminal 5 may be plated with nickel or the like for the purpose of anticorrosion or the like.

The metal terminal 5 includes: a bar-like terminal leg portion 51 provided on the front end side; a terminal flange portion 52 provided on the rear end side of the terminal leg portion 51; and a cap mounting portion 53 provided to the rear end side relative to the terminal flange portion 52. The terminal leg portion 51 is inserted in the through-hole 21 of the insulator 2. The terminal flange portion 52 is a portion that is exposed from a rear end portion of the insulator 2 and that is engaged with the rear end portion. The cap mounting portion 53 is a portion to which a plug cap (not shown) having a high-voltage cable connected thereto is mounted, and through the cap mounting portion 53, a high voltage for causing spark discharge is applied from outside.

The resistor 7 is disposed, in the through-hole 21 of the insulator 2, between the front end (the front end of the terminal leg portion 51) of the metal terminal 5 and the rear end (the rear end of the center electrode body 31) of the center electrode 3. The resistor 7 has a resistance (e.g., 5 kΩ) of not less than 1 kΩ, for example, and has a function of reducing electric wave noise at the time of occurrence of spark, for example. The resistor 7 is formed from a composition that contains glass particles as a main component, ceramic particles other than glass, and a conductive material.

A space is provided between the front end of the resistor 7 and the rear end of the center electrode 3 in the through-hole 21, and a conductive seal member 8 is provided in a form of filling the space. A space is also provided between the rear end of the resistor 7 and the front end of the metal terminal 5 in the through-hole 21, and a conductive seal member 9 is provided in a form of filling the space. Each seal member 8, 9 is formed from a conductive composition that contains glass particles of a $B_2O_3$—$SiO_2$-based material or the like and metal particles (Cu, Fe, etc.), for example.

The ground electrode 4 includes a ground electrode body 41 joined to the front end of the metal shell 6, and a ground electrode tip 42 having a quadrangular column shape. The ground electrode body 41 is made of, as a whole, a plate piece bent in a substantially L-shape at a portion, and a rear end portion 41*a* thereof is joined to the front end of the metal shell 6 by resistance welding or the like. Accordingly, the metal shell 6 and the ground electrode body 41 are electrically connected to each other. Similar to the metal shell 6, the ground electrode body 41 is formed by using, for example, nickel or a nickel-based alloy (e.g., NCF600, NCF601) mainly composed of nickel. Similar to the tip 32 of the center electrode 3, the ground electrode tip 42 is made from an iridium-based alloy mainly composed of iridium (Ir), for example. The ground electrode tip 42 is joined to a front end portion of the ground electrode body 41 by laser welding.

The ground electrode tip 42 at the front end portion of the ground electrode body 41 and the tip 32 at the front end portion of the center electrode 3 are disposed so as to be opposed to each other while keeping an interval with each other. That is, there is a space SP between the tip 32 at the front end portion of the center electrode 3 and the ground electrode tip 42 at the front end portion of the ground electrode 4, and when a high voltage is applied between the center electrode 3 and the ground electrode 4, spark discharge occurs, in the space SP, in a form of being generally along the axial line AX direction.

Next, the insulator 2 will be described in detail. The insulator 2, as a whole, has a tubular shape (cylindrical shape) elongated along the axial line AX direction and includes therein the through-hole 21 extending in the axial line AX direction, as shown in FIG. 1. The insulator 2 is formed from an alumina-based sintered body, having a tubular shape (cylindrical shape), which is mainly composed of alumina. The insulator 2 includes: a leg portion 22 provided on the front end side; a middle trunk portion 23 which is a portion provided on the rear end side of the leg portion 22 and which has a larger diameter than the leg portion 22; and a flange portion 24 which is a portion provided on the rear end side of the middle trunk portion 23 and which has a larger diameter than the middle trunk portion 23. The first diameter-enlarged portion 26 is provided between the leg portion 22 and the middle trunk portion 23, and a second diameter-enlarged portion 27 is provided between the middle trunk portion 23 and the flange portion 24.

The leg portion 22, as a whole, has an elongated tubular shape (cylindrical shape) of which the outer diameter is gradually increased from the front side toward the rear side, and has a smaller outer diameter than the middle trunk portion 23 and the first diameter-enlarged portion 26. When the spark plug 1 is mounted to the engine (engine head), the leg portion 22 is exposed in the combustion chamber of the engine.

The flange portion 24 is provided substantially at the center of the insulator 2 in the axial line AX direction, and has an annular shape. The resistor 7 is provided in the through-hole 21 inside the flange portion 24.

The first diameter-enlarged portion 26 is a portion connecting the leg portion 22 and the middle trunk portion 23, and has a cylindrical shape (annular shape) of which the outer diameter gradually increases from the front side toward the rear side. When the insulator 2 is mounted to the metal shell 6, the outer surface of this first diameter-enlarged portion 26 of the insulator 2 is placed against, with the packing P1 interposed, the surface of the step portion 66 provided on the inner periphery side of the metal shell 6.

The second diameter-enlarged portion 27 is a portion connecting the middle trunk portion 23 and the flange portion 24, and has a cylindrical shape (annular shape) of which the outer diameter is larger than the first diameter-enlarged portion 26 and of which the outer diameter gradually increases from the front side toward the rear side.

The middle trunk portion 23 has a tubular shape (cylindrical shape) of which the outer diameter is set to be substantially the same in the axial line AX direction. In a state where the insulator 2 is mounted to the metal shell 6, a minute space is present between the outer surface (outer peripheral surface) of the middle trunk portion 23 and the inner surface (inner peripheral surface) of the metal shell 6. On the inner side (inner peripheral surface side) close to the front end of the middle trunk portion 23, the step portion 23*a* having an annular shape is provided. In a state where the center electrode body 31 of the center electrode 3 is housed in the through-hole 21 of the insulator 2, the electrode flange portion (diameter-enlarged portion) 31*a* of the center electrode body 31 is engaged with the surface of the step portion 23*a*. The thickness (the thickness in the radial direction) of the wall portion of the middle trunk portion 23 is larger than the thickness of the wall portion of the leg portion 22. In the middle trunk portion 23, the thickness of the wall portion of the part from the front end side up to the step portion 23*a* is larger than the thickness of the wall portion of the part on the rear side thereof.

The outer peripheral surface of the middle trunk portion 23 is exposed to the atmosphere (air), and it can be said that the middle trunk portion 23 is in an environment in which electricity is easily conducted when compared with the leg portion 22. Therefore, the thickness of the wall portion of the middle trunk portion 23 is set to be larger than that of the leg portion 22.

In the present specification, unless otherwise specified, the "thickness of the middle trunk portion 23" denotes the thickness of the wall portion, in the middle trunk portion 23, of the part (i.e., the part on the rear end side relative to the step portion 23*a*) where the thickness of the wall portion is substantially constant. The thickness of the middle trunk portion 23 is not limited in particular as long as the object of the present invention is not impaired, and may be set in a range of not less than 2.0 mm and not greater than 3.0 mm, for example.

The insulator 2 further includes the rear-side tube portion 25 connected to the rear end side of the flange portion 24 and having a tubular shape (cylindrical shape) extending in the axial line AX direction. The rear-side tube portion 25 has an outer diameter smaller than the outer diameter of the flange portion 24. In the through-hole 21 inside the rear-side tube portion 25, the bar-like terminal leg portion 51 of the metal terminal 5, and the like, are provided.

Figure 2:
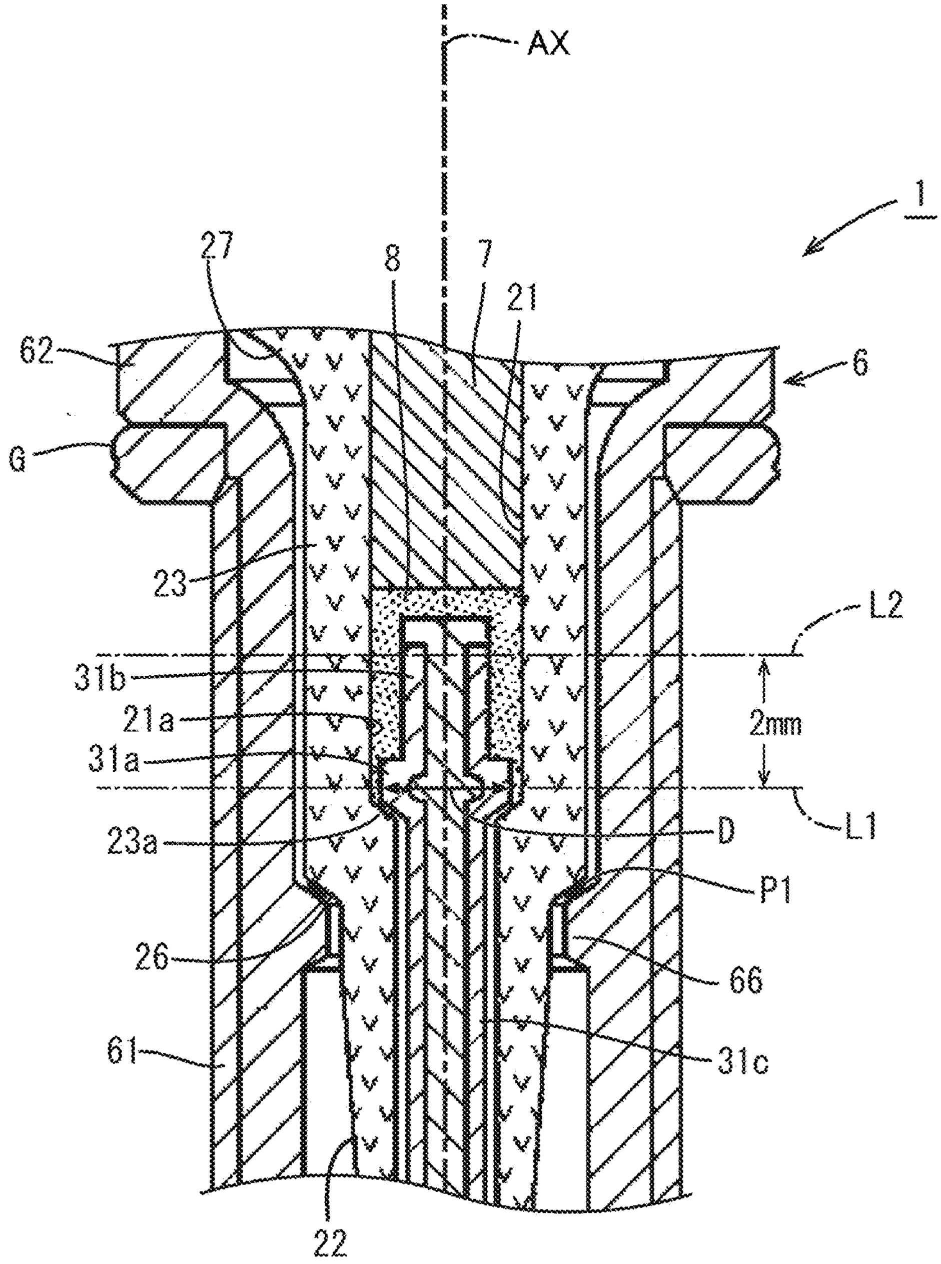
FIG. 2 is an enlarged sectional view of the vicinity of an electrode flange portion of a center electrode housed in a middle trunk portion of the insulator.

FIG. 2 is an enlarged sectional view of the vicinity of the electrode flange portion (diameter-enlarged portion) 31*a* of the center electrode 3 (the center electrode body 31) housed in the middle trunk portion 23 of the insulator 2. As shown in FIG. 2, in a state where the center electrode body 31 of the center electrode 3 is housed inside the insulator 2, there is a space between: the inner wall 21*a* of the insulator 2; and the electrode flange portion (diameter-enlarged portion) 31*a* and the electrode head portion 31*b* which are portions on the rear end side of the center electrode body 31. In a form of filling the space and covering the rear end of the center electrode body 31, the through-hole 21 of the insulator 2 is filled with the seal member 8 described above. The seal member 8 contains an alkaline component derived from glass particles and the like.

The interval between the electrode flange portion (diameter-enlarged portion) 31*a* of the center electrode 3 and the inner wall 21*a* of the insulator 2 is smaller than the interval between the electrode head portion 31*b* and the inner wall 21*a* of the insulator 2. In such a place, heat having moved from the front end side of the center electrode body 31 of the center electrode 3 through the electrode flange portion (diameter-enlarged portion) 31*a* easily accumulates. In addition, in that place, electric fields are easily concentrated when a high voltage is applied to the center electrode 3. Therefore, in the middle trunk portion 23 in the insulator 2, particularly the portion opposed to the electrode flange portion (diameter-enlarged portion) 31*a* in the radial direction is in a harshest environment.

Since the inner side of the middle trunk portion 23 having a tubular shape is filled with the seal member 8, the inner wall 21*a* of the middle trunk portion 23 is in a state of being in direct contact with the seal member 8, and a state where the alkaline component derived from the seal member 8 can be in contact with the inner wall 21*a* of the middle trunk portion 23 is also present. In the insulator 2 of the present embodiment, the internal structure of the alumina-based sintered body forming the middle trunk portion 23 at least satisfies Condition 1 and Condition 2 shown below, and thus, the insulator 2 of the present embodiment is excellent in the withstand voltage performance and the like.

<Condition 1>

In a mirror-polished surface 230*a* obtained by mirror-polishing a cut surface 230 obtained by cutting the insulator 2 in a direction perpendicular to the axial line AX direction, at a position separated by 2 mm from a portion having the maximum diameter of the electrode flange portion (diameter-enlarged portion) 31*a* of the center electrode 3 to the rear end side of the spark plug 1 along the axial line AX direction, when 20 first observation regions X each being 192 μm×255 μm are set so as to each overlap a reference position m1 being a position 0.2 mm in the radial direction from an inner peripheral surface 2*a* side of the insulator 2 and so as not to overlap each other, the proportion (porosity) of the area of all of pores included in the 20 first observation regions X relative to the total area (100%) of the 20 first observation regions X is not greater than 3.5%.

Here, Condition 1 will be described in detail with reference to FIG. 2 to FIG. 4. The "portion having the maximum diameter of the electrode flange portion (diameter-enlarged portion) 31*a* of the center electrode 3" shown in Condition 1 is the portion, of the electrode flange portion (diameter-enlarged portion) 31*a* of the center electrode body 31 of the center electrode 3, of which a diameter D is maximum, as shown in FIG. 2. FIG. 2 shows a straight line L1 so as to perpendicularly cross the axial line AX and extend across the portion having the maximum diameter of the electrode flange portion (diameter-enlarged portion) 31*a*.

Then, the insulator 2 is cut, as described later, at a position separated by 2 mm from the portion having the maximum diameter of the electrode flange portion (diameter-enlarged portion) 31*a* to the rear end side of the spark plug 1 along the axial line AX direction. In the insulator 2, the range in the axial line AX direction from the portion having the maximum diameter of the electrode flange portion (diameter-enlarged portion) 31*a* to a position separated by at least 2 mm is the place for which durability (withstand voltage performance, etc.) is required most. The internal structure of the alumina-based sintered body forming such a range is basically the same, and thus, in the present embodiment, in consideration of ease of cutting, etc., the position separated by 2 mm from the portion having the maximum diameter of the electrode flange portion (diameter-enlarged portion) 31*a* to the rear end side is set as the place where the insulator 2 is cut.

In a case where the portion having the maximum diameter of the electrode flange portion (diameter-enlarged portion) 31*a* is formed so as to have a certain width from the front end side toward the rear end side in the axial line AX direction, the position (the position indicated by the straight line L1) serving as a reference when the position separated by 2 mm to the rear end side is to be set is the position on the frontmost side in the portion having the maximum diameter.

In FIG. 2, the place where the insulator 2 is cut is indicated by a straight line L2. The straight line L2 is shown so as to perpendicularly cross the axial line AX at the position separated by 2 mm from the straight line L1 to the rear end side (the upper side in FIG. 2). As shown in FIG. 2, the straight line L2 extends so as to cross the middle trunk portion 23 of the insulator 2 in the radial direction. In Condition 1, the state of the internal structure of the cut surface 230 obtained by cutting the middle trunk portion 23 in the radial direction along the straight line L2 is defined.

Figure 3:
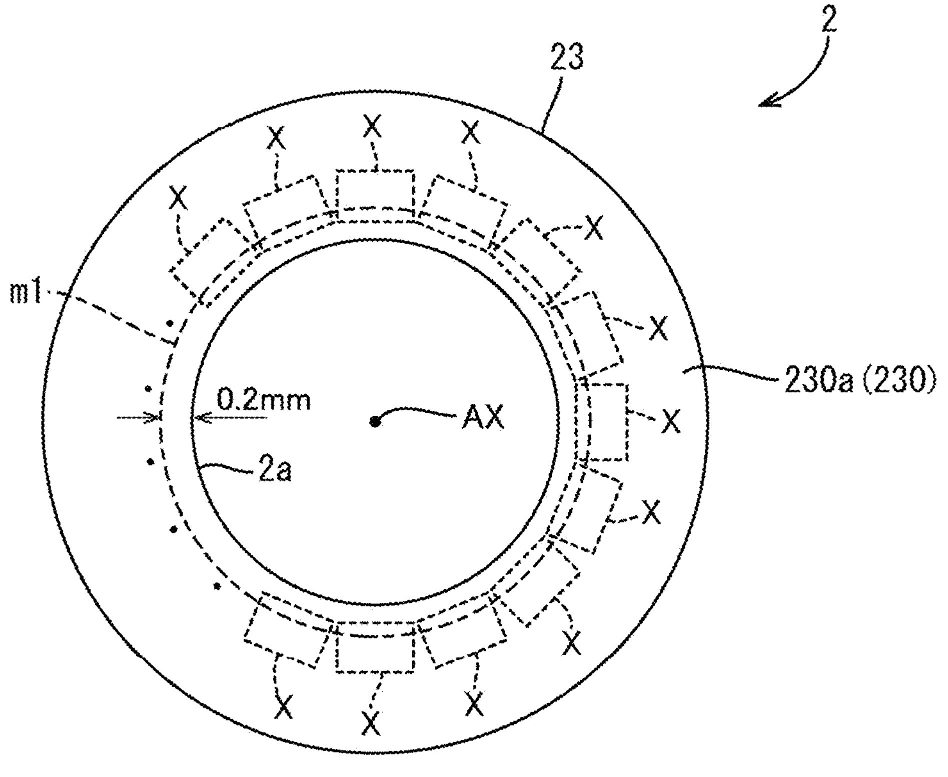
FIG. 3 schematically illustrates a mirror-polished surface obtained by mirror-polishing a cut surface of the middle trunk portion of the insulator.
Figure 4:
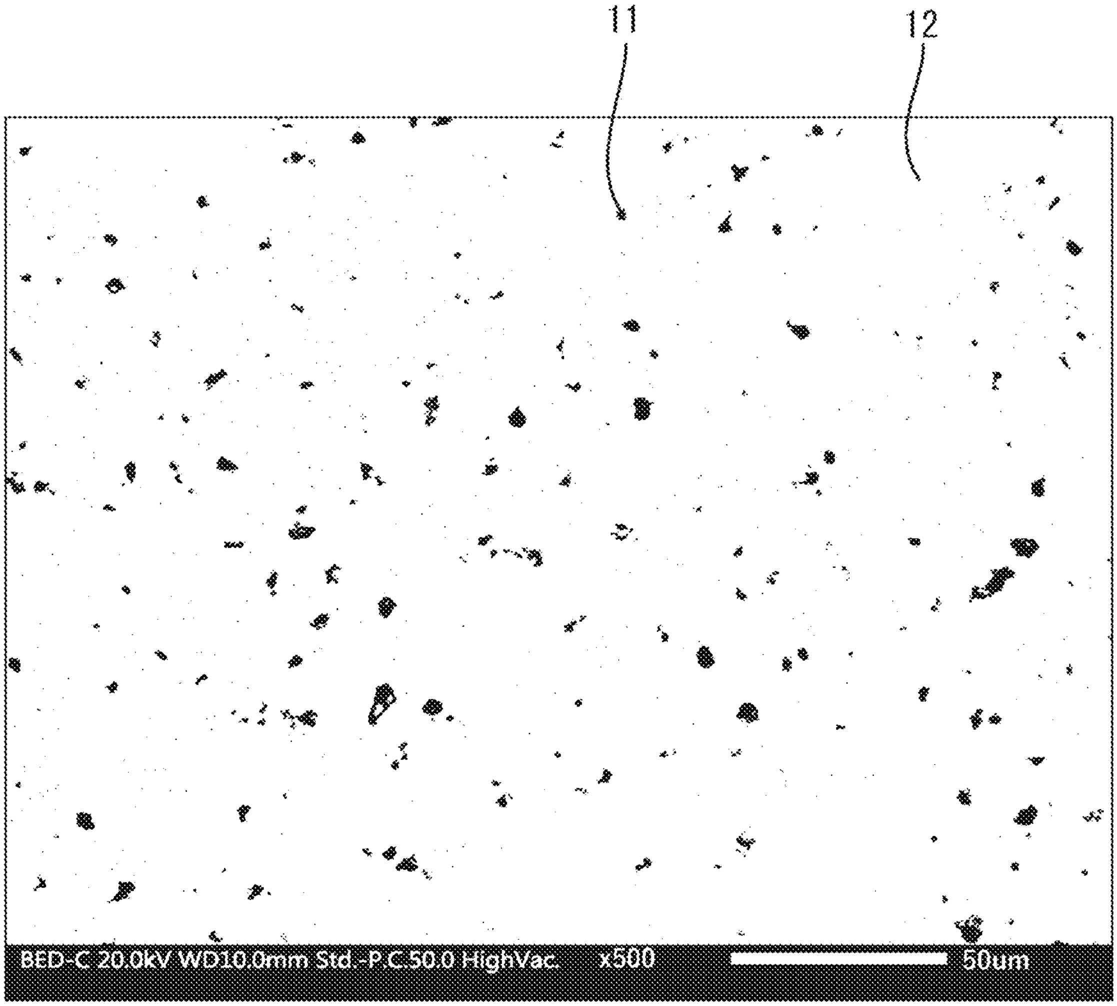
FIG. 4 illustrates a binarized image obtained through banalization of an SEM image.

FIG. 3 schematically illustrates the mirror-polished surface 230*a* obtained by mirror-polishing the cut surface 230 of the middle trunk portion 23 of the insulator 2. In FIG. 3, the cut surface 230 obtained by cutting the middle trunk portion 23 into a round slice shape along the straight line L2 shown in FIG. 2 is shown in a state of being polished into a mirror state. The cut surface 230 having been subjected to a later-described mirror-polishing treatment and being in a mirror state will be referred to as the mirror-polished surface 230*a*.

The mirror-polishing treatment for the cut surface 230 is performed based on a known technique using a diamond grinding wheel, a polishing agent such as a diamond paste, or the like. The mirror-polishing treatment is performed until the surface roughness (Ra) of the cut surface 230 becomes about 0.001 μm, for example.

The mirror-polished surface 230*a* is observed by using a scanning electron microscope (SEM). Thus, the mirror-polished surface 230*a* may be subjected to carbon vapor deposition for providing conductivity, as necessary. In the case of the present embodiment, the acceleration voltage of the SEM during observation of the mirror-polished surface 230*a* is set to 20 kV, and the magnification of the SEM is set to 500 times.

As shown in FIG. 3, the mirror-polished surface 230*a* has an annular shape. In such a mirror-polished surface 230*a*, the reference position m1 in a circular shape is set at the position 0.2 mm in the radial direction from the inner peripheral surface 2*a* side of the insulator 2. In Condition 1, in the mirror-polished surface 230*a*, 20 first observation regions X are set, in a plan view, so as to each overlap the reference position m1 and so as not to overlap each other.

Each first observation region X is a region set so as to grasp the state of pores (voids) 11 in the internal structure of the mirror-polished surface 230*a* (the cut surface 230), and has a rectangular shape. The first observation region X is a region having a rectangular shape of which one side has a length of 192 μm and of which the other side has a length of 255 μm (i.e., 192 μm×255 μm).

Each first observation region X is set, in a plan view, so as to overlap the reference position m1 in a circular shape being the position 0.2 mm in the radial direction from the inner peripheral surface 2*a* side of the insulator 2. When the first observation region X is set on the mirror-polished surface 230*a* in the vicinity of the inner peripheral surface 2*a* of the insulator 2, if the internal structure on the inner peripheral surface 2 side of the insulator 2 (the middle trunk portion 23) has been corroded by an alkaline component, the state of the original internal structure of the insulator 2 cannot be observed. Therefore, in the present embodiment, as described above, the first observation region X is set so as to overlap the reference position m1. In the mirror-polished surface 230*a*, 20 first observation regions X in total are set so as not to overlap each other. In the case of the present embodiment, as shown in FIG. 3, these first observation regions X are preferably set so as to be arranged in an annular shape while keeping an interval with each other in the mirror-polished surface 230*a* having an annular shape.

An image of the mirror-polished surface 230*a* in the range corresponding to such a first observation region X is captured by using the SEM, whereby an SEM image corresponding to the first observation region X is acquired. The SEM image is acquired for each of the 20 first observation regions X. That is, 20 SEM images in total are acquired so as to correspond to the 20 first observation regions X in total.

With respect to the 20 SEM images in total, image analysis processing is performed by using known image analysis software (e.g., WinROOF (registered trademark) manufactured by MITANI CORPORATION) that is executed on a computer.

In the image analysis processing, first, with respect to each individual SEM image, a size calibration process (calibration) according to a scale bar provided to the SEM image is performed.

Next, binarization is performed on the SEM image after the calibration process. FIG. 4 illustrates a binarized image obtained through binarization of an SEM image. In the binarization, the brightness (lightness) of each pixel in the SEM image is expressed in two gradations by using a predetermined threshold (e.g., threshold=118). That is, with respect to a pixel of which the brightness is not greater than a threshold, the brightness of the pixel is set to "0", and with respect to a pixel of which the brightness exceeds the threshold, the brightness of the pixel is set to "255". The expression in the two gradations eliminates intermediate gradations, whereby a binarized image is obtained. In the binarized image in FIG. 4, pores 11 are shown in black, and the other portion (ceramic portion) 12 is shown in white.

Then, by use of the binarized image corresponding to the first observation region X, and by a known image analysis technique, extraction of all of the pores (voids) 11 included in the first observation region X is performed. At the extraction of the pores 11, the area of each pore 11 is also obtained by a known image analysis technique.

Subsequently, with respect to all of the pores 11 extracted from the binarized image, the total area of those pores 11 is calculated. Then, the proportion (porosity) (hereinafter, this may be referred to as "proportion V") of the total area of all of the pores 11 included in the 20 first observation regions X relative to the total area (100%) of the 20 first observation regions X is obtained.

In the case of the present embodiment, the internal structure of the insulator 2 (the middle trunk portion 23) is formed such that the proportion V (porosity) under Condition 1 becomes not greater than 3.5%.

The insulator 2 including pores satisfying Condition 1 is obtained by, for example, applying a pressure under a higher pressure condition than in conventional art when granulated powder is molded with a predetermined mold in a molding step in the manufacturing direction of the insulator 2 described later.

<Condition 2>

In a thermally etched surface 230*b* obtained by subjecting the mirror-polished surface 230*a* to thermal etching, when 20 second observation regions Y each being 32 μm×43 μm are set so as to each overlap the reference position m1 and so as not to overlap each other, the particle size distribution of alumina particles included in the 20 second observation regions is regarded as a normal distribution, the average particle diameter of the alumina particles is defined as A, and the standard deviation of the particle diameter of the alumina particles is defined as σ, A is not less than 1.9 μm and not greater than 2.8 μm, and (A+3σ) is not greater than 3.0 μm.

Here, Condition 2 will be described in detail with reference to FIG. 5 and FIG. 6. In Condition 2, similar to Condition 1, the state of the internal structure of the cut surface 230 of the same insulator 2 (the middle trunk portion 23) is defined. However, in Condition 2, in a state of the thermally etched surface 230, instead of the above-described mirror-polished surface 230*a*, obtained by subjecting the mirror-polished surface 230*a* to thermal etching, the state of the internal structure is observed.

The thermal etching is a treatment in which, in a state of being placed in a predetermined electric furnace or the like, a sample (the insulator 2) including the mirror-polished surface 230*a* is held for a predetermined time (e.g., one hour) at a temperature condition (e.g., 1400° C.) lower by about 200° C. than the sintering temperature of the insulator 2, and then allowed to cool in the furnace. When such a treatment is performed, a recess is formed at the interface of each alumina particle present at the cut surface 230 (the thermally etched surface 230*b*). Thus, the alumina particles can be individually observed. The alumina-based sintered body forming the insulator 2 is a liquid phase sintered body, and through the thermal etching, the liquid phase (glass component) around the alumina particles at the cut surface 230 is removed.

Figure 5:
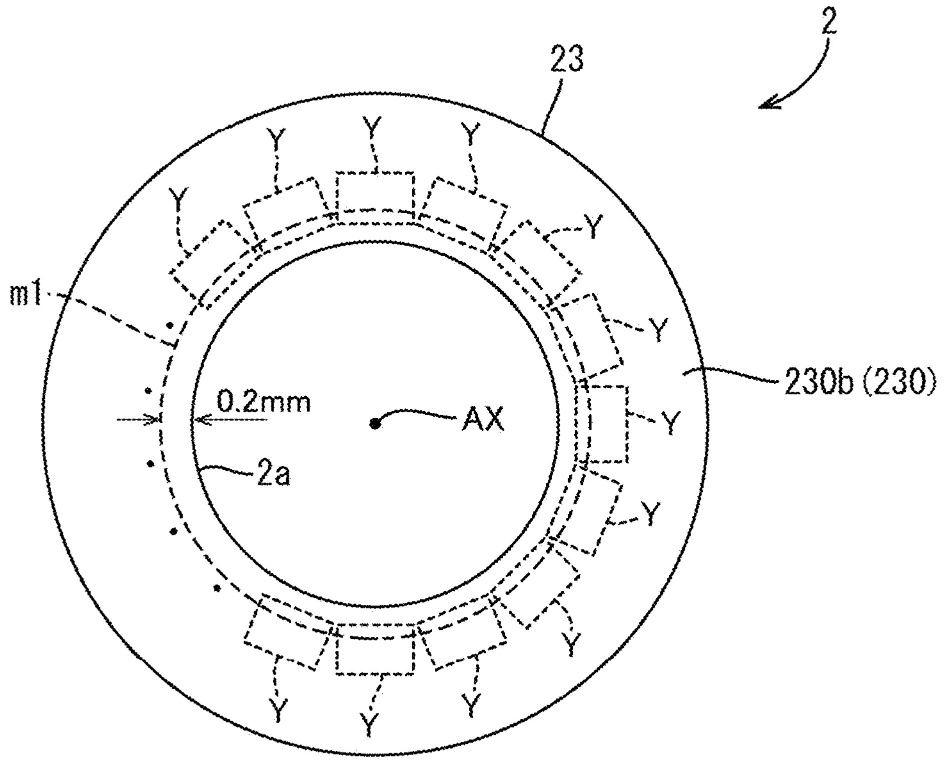
FIG. 5 schematically illustrates a thermally etched surface of the middle trunk portion of the insulator.
Figure 6:
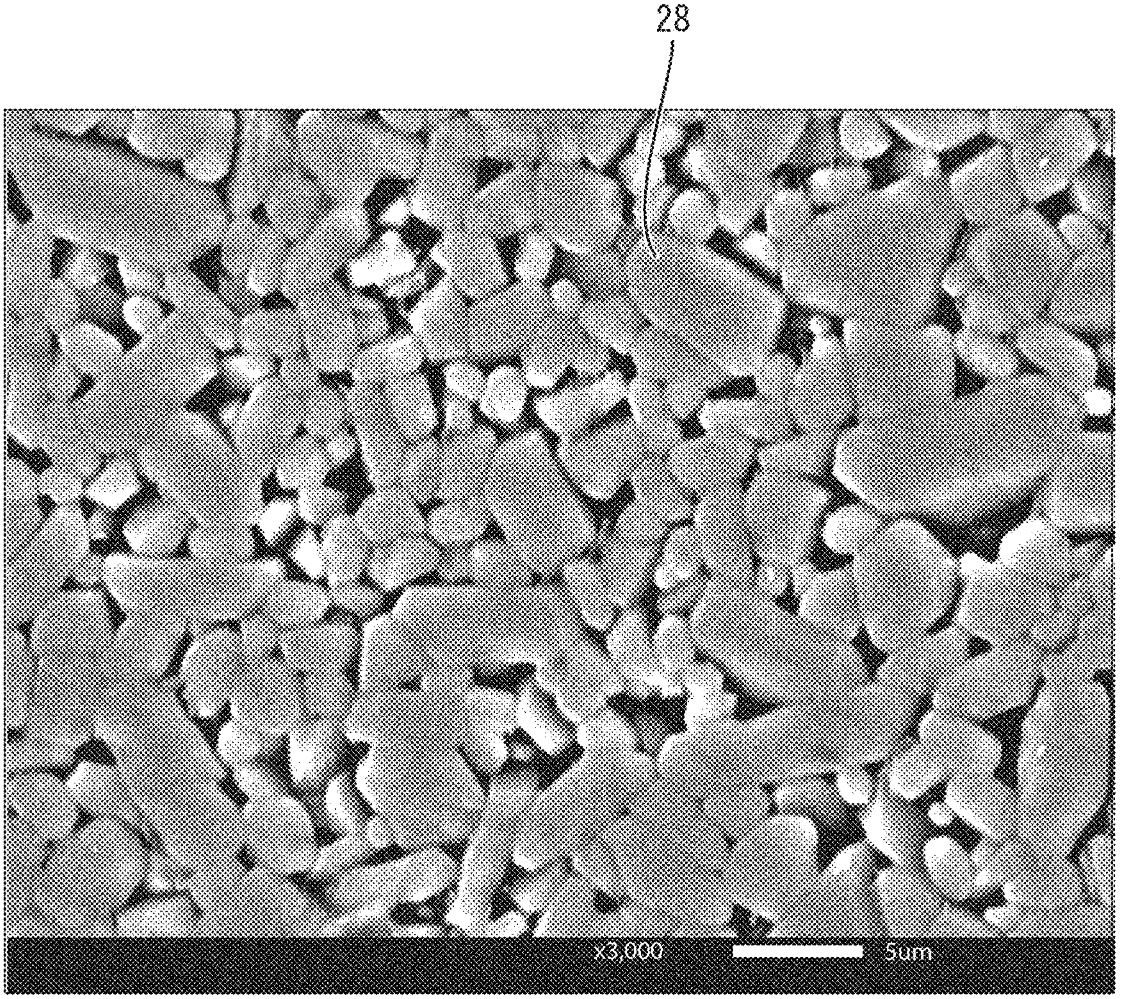
FIG. 6 illustrates an SEM image corresponding to a second observation region.

FIG. 5 schematically illustrates the thermally etched surface 230*b* of the middle trunk portion 23 of the insulator 2. The thermally etched surface 230*b* is observed by using a scanning electron microscope (SEM). Thus, the thermally etched surface 230*b* may be subjected to carbon vapor deposition for providing conductivity, as necessary. The acceleration voltage of the SEM during observation of the thermally etched surface 230*b* is set to 20 kV, and the magnification of the SEM is set to 3000 times.

Similar to the mirror-polished surface 230*a*, the thermally etched surface 230*b* has an annular shape, and in the thermally etched surface 230*b*, the reference position m1 in a circular shape is set at the position 0.2 mm in the radial direction from the inner peripheral surface 2*a* side of the insulator 2.

Each second observation region Y is a region set so as to grasp the state of alumina particles in the internal structure of the thermally etched surface 230*b* (the cut surface 230). Although being smaller in size than the first observation region X, the second observation region Y has a rectangular shape, similar to the first observation region X. The second observation region Y is a region having a rectangular shape of which one side has a length of 32 μm and of which the other side has a length of 43 μm (i.e., 132 μm×43 μm).

Each second observation region Y is set so as to overlap the reference position m1 in a plan view. The reason for setting the second observation region Y so as to overlap the reference position m1 is the same as the reason for setting the first observation region X so as to overlap the reference position m1 in the mirror-polished surface 230*a*. 20 second observation regions Y in total are set, in a plan view, so as not to overlap each other in the thermally etched surface 230*b*. These second observation regions Y are preferably set so as to be arranged in an annular shape while evenly keeping an interval with each other in the thermally etched surface 230*b* having an annular shape, as shown in FIG. 5.

In Condition 2, it is defined that, when the particle size distribution of alumina particles included in the 20 second observation regions Y set as described above is regarded as a normal distribution, the average particle diameter of the alumina particles is defined as A, and the standard deviation of the particle diameter of the alumina particles is defined as σ, A is not less than 1.9 μm and not greater than 2.8 μm, and (A+3σ) is not greater than 3.0 μm.

The particle diameter of each alumina particle included in a second observation region Y is obtained on the basis of an SEM image of the thermally etched surface 230*b* in a range corresponding to the second observation region Y. FIG. 6 illustrates an SEM image corresponding to the second observation region Y. In FIG. 6, a large number of alumina particles 28 are shown. An image of the thermally etched surface 230*b* in a range corresponding to the second observation region Y is captured by using the SEM, whereby an SEM image is acquired. The SEM image is acquired for each of the 20 second observation regions Y. That is, 20 SEM images in total are acquired so as to correspond to the 20 second observation regions Y in total.

The particle diameter of each alumina particle is measured according to JIS G0551 "ferritic or austenitic grain size measurement" while using an SEM image corresponding to the second observation region Y. Then, using the measurement result of the particle diameter of each alumina particle, the average particle diameter A of the alumina particles is obtained. In the case of the present embodiment, the average particle diameter A of the alumina particles is adjusted to be not less than 1.9 μm and not greater than 2.8 μm.

When the average particle diameter A of the alumina particles is to be measured, banalization, etc., of the SEM image is performed as appropriate by using known image analysis software (this also applies to measurement of the long diameter, etc., of alumina particles described later).

The internal structure of the insulator 2 (the middle trunk portion 23) is formed such that, when the particle size distribution (the frequency distribution of the particle diameter) of alumina particles included in the second observation region Y is regarded as a normal distribution, and the standard deviation of the particle diameter of the alumina particles according to the normal distribution is defined as σ, (A+3σ) is not greater than 3.0 μm.

The insulator 2 satisfying Condition 2 is obtained by, during manufacture, for example, using Al compound powder (alumina powder, etc.), having a small (sharp) particle size distribution, in which particles having small particle diameters that may cause abnormal grain growth are removed.

In the spark plug 1 of the present embodiment, when the internal structure of the insulator 2 (in particular, the middle trunk portion 23) at least satisfies Conditions 1, 2 above, control such that the alumina-based sintered body forming the insulator 2 (the middle trunk portion 23) is dense, the particle diameter (the average particle diameter A) of the alumina particles is large to some extent, and in addition, the particle diameter of most alumina particles is within a predetermined small range (A±3σ), is realized. Therefore, presence of alumina particles having undergone abnormal grain growth to possibly serve as a start point of breakage of the insulator is substantially eliminated. Therefore, the insulator 2 of the spark plug 1 of the present embodiment is excellent in the withstand voltage performance, and is also excellent in the alkaline corrosion resistance because the number of pores that an alkaline component may enter is small.

Further, in the spark plug 1 of the present embodiment, the internal structure of the middle trunk portion 23 of the insulator 2 may be formed so as to satisfy Condition 3 described later, other than Conditions 1, 2 above.

<Condition 3>

In the 20 second observation regions Y in the thermally etched surface 230*b*, when top three alumina particles having the largest long diameters d1 are selected for each second observation region Y, to select 60 representative alumina particles having large long diameters d1, the frequency distribution of the aspect ratio of the representative alumina particles is regarded as a normal distribution, the average aspect ratio of the representative alumina particles is defined as B, and the standard deviation of the aspect ratio of the representative alumina particles is defined as σ, (B+3σ) is not greater than 4.8.

Condition 3 defines the state of 60 alumina particles having large long diameters d1 among the alumina particles in the internal structure of the thermally etched surface 230*b* (the cut surface 230).

The long diameter d1 and a short diameter d2 of each alumina particle in a second observation region Y are obtained by an intercept method. First, in an SEM image of a rectangular region corresponding to the second observation region Y, crystal grains of alumina particles that cross at least one of two diagonals are selected, and the maximum diameter of each of the selected crystal grains is obtained, to be used as the long diameter d1 of the alumina particle. The maximum diameter is the maximum value when the outer diameter of the crystal grain is measured from all directions. Then, the outer diameter of the crystal grain of the alumina particle on a straight line passing through the middle point of the long diameter d1 and orthogonal to the long diameter d1 is used as the short diameter d2 of the alumina particle.

Measurement of the long diameter d1 of the alumina particle is performed for all of the alumina particles included in the 20 second observation regions Y. Measurement of the short diameter d2 of the alumina particle may be performed at least for the representative alumina particles described later.

After the long diameter d1 of each alumina particle has been measured, 60 alumina particles having large long diameters d1 are selected from the 20 second observation regions Y. Specifically, for each second observation region Y, top three alumina particles having the largest long diameters d1 are selected. The 60 alumina particles in total selected in this manner will be referred to as “representative alumina particles”.

The aspect ratio is obtained on the basis of the long diameter d1 and the short diameter d2 of each of the 60 representative alumina particles. The aspect ratio (d1/d2) of each representative alumina particle is the ratio of the long diameter d1 relative to the short diameter d2.

The internal structure of the insulator 2 (the middle trunk portion 23) may be formed such that, when the frequency distribution of the aspect ratio of the 60 representative alumina particles is regarded as a normal distribution, the average aspect ratio of the representative alumina particles is defined as B, and the standard deviation of the aspect ratio of the representative alumina particles is defined as σ, (B+3σ) is not greater than 4.8.

In general, when an alumina particle undergoes abnormal grain growth, the aspect ratio increases. When the insulator 2 (the middle trunk portion 23) satisfies Condition 3, even when the representative alumina particles are selected as large alumina particles out of the alumina particles, the aspect ratio of the representative alumina particles is relatively small, and in addition, is within a predetermined small range (B±3σ). Thus, it is indicated that such representative alumina particles do not, more assuredly, include alumina particles having undergone abnormal grain growth to possibly serve as a start point of breakage of the insulator.

Figure 7:
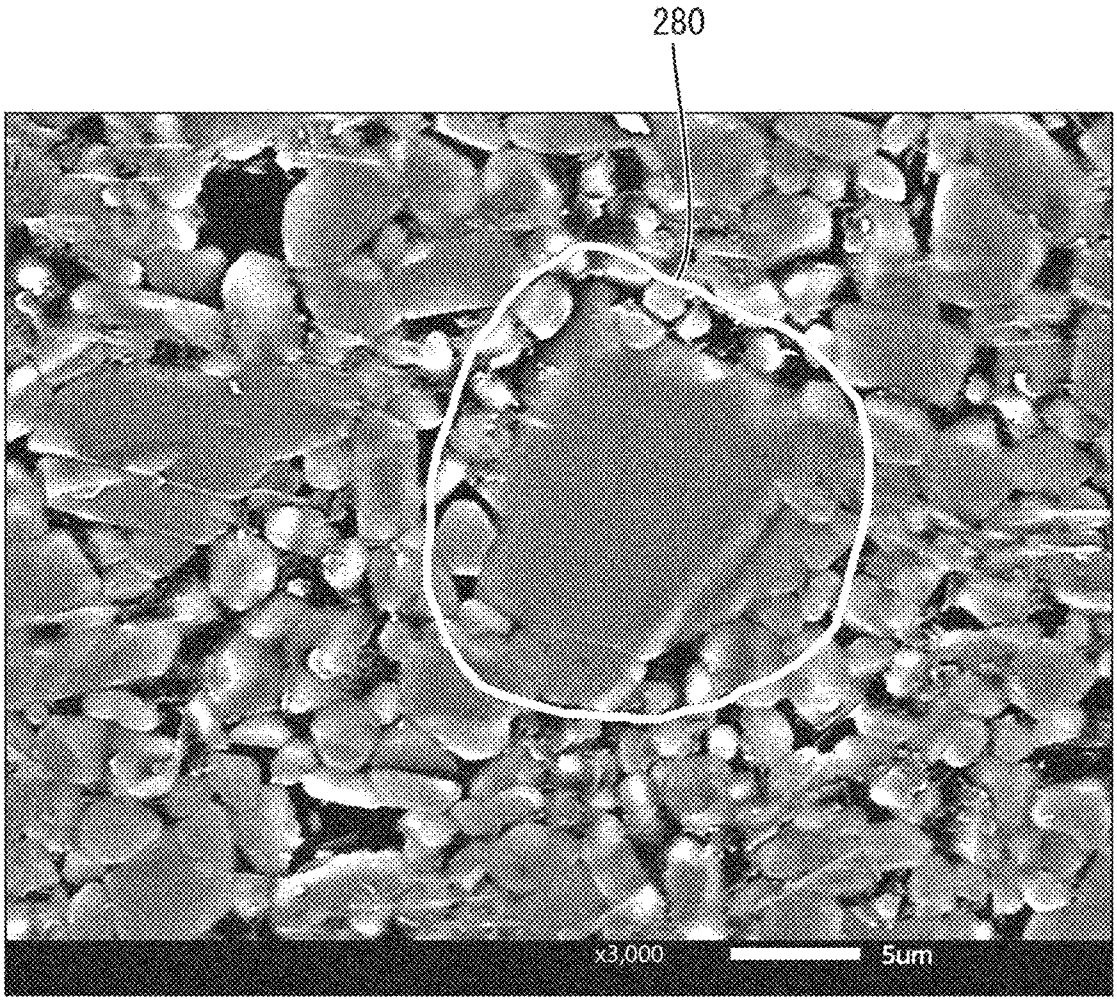
FIG. 7 illustrates an SEM image of a cut surface of an insulator including an alumina particle having undergone abnormal grain growth.

FIG. 7 illustrates an SEM image of a cut surface of an insulator including an alumina particle 280 having undergone abnormal grain growth. FIG. 7 shows an SEM image of a cut surface (thermally etched surface) of a middle trunk portion of an insulator of Comparative Example. The large alumina particle 280 shown in FIG. 7 is significantly large when compared with alumina particles therearound, and the vicinity of the alumina particle 280 is likely to serve as a start point of breakage of the insulator.

<Condition 4>

In the 20 second observation regions Y in the thermally etched surface 230*b*, out of the representative alumina particles, the number of representative alumina particles of which the aspect ratio is not less than 3.5 is not greater than two.

Condition 4 defines the state of the representative alumina particles in the internal structure of the thermally etched surface 230*b* (the cut surface 230). An alumina particle of which the aspect ratio is not less than 3.5 is highly likely to have undergone abnormal grain growth, and it is preferable that such an alumina particle is not included in the internal structure of the middle trunk portion 23 of the insulator 2.

When the insulator 2 (the middle trunk portion 23) satisfies Condition 4, even the representative alumina particles, which are large alumina particles among the alumina particles, have an aspect ratio that is further smaller, and it is indicated that the representative alumina particles do not, further assuredly, include alumina particles having undergone abnormal grain growth to possibly serve as a start point of breakage of the insulator, when compared with Condition 3.

<Condition 5>

In the 20 first observation regions X in the mirror-polished surface 230*a*, the number of pores is not greater than 600.

Similar to Condition 1, Condition 5 defines the state of the pores (voids) 11 in the internal structure of the mirror-polished surface 230*a* (the cut surface 230). In the 20 first observation regions X, the number of pores is preferably not greater than 600.

When the insulator 2 (the middle trunk portion 23) satisfies Condition 5, the porosity under Condition 1 is easily controlled to a predetermined value, and the alkaline corrosion resistance is easily improved.

Next, a method for manufacturing the insulator 2 will be described. The insulator 2 is one manufactured so as to satisfy Conditions 1, 2, and the like described above. The method for manufacturing the insulator 2 is not limited in particular as long as the finally obtained insulator 2 satisfies Conditions 1, 2, and the like. Here, an example of the method for manufacturing the insulator 2 is described.

The method for manufacturing the insulator 2 mainly includes a slurry production step, a deaeration step, a granulation step, a molding step, a grinding step, and a sintering step.

<Slurry Production Step>

The slurry production step is a step of producing a slurry by mixing a raw material powder, a binder, and a solvent. As for the raw material powder, as a main component, powder (hereinafter, Al compound powder) of a compound that is converted into alumina through sintering is used. As the Al compound powder, alumina powder is used, for example.

In the slurry production step, a milling step is performed for the purpose of mixing and milling the raw material powder. The milling step is performed by using a wet milling machine that uses a ball mill and the like. The diameter of cobbles used in the wet milling machine is not limited in particular as long as the object of the present invention is not impaired, and is preferably not less than 3 mm and not greater than 20 mm, more preferably not less than 3 mm and not greater than 10 mm, further preferably not less than 3 mm and not greater than 6 mm. As the cobbles, two or more types of cobbles having diameters different from each other may be combined. Through this milling step, the raw material powder comes to have a small variation in the particle size (particle diameter) and a sharp particle size distribution. When such raw material powder is used, in an alumina-based sintered body obtained after sintering, abnormal grain growth is suppressed and the sintered density can be increased. Therefore, the alkaline corrosion resistance of the insulator is improved.

The particle diameter (the particle diameter after milling) of the Al compound powder (e.g., alumina powder) is not limited in particular as long as the object of the present invention is not impaired, and is, for example, preferably not less than 1.5 μm and more preferably not less than 1.7 μm, and preferably not greater than 2.5 μm and more preferably not greater than 2.0 μm. When the particle diameter of the Al compound powder (e.g., alumina powder) is in such a range, the number of defects of the insulator is suppressed, and an appropriate sintered density is obtained. The particle diameter is the median diameter (D50) based on volume measured by a laser diffraction method (a microtrac particle size distribution measuring device manufactured by Nikkiso Co., Ltd., product name "MT-3000").

When the mass (in oxide equivalent) of the alumina-based sintered body after sintering is defined as 100 mass %, the Al compound powder is prepared so as to account for preferably not less than 90 mass % in oxide equivalent, more preferably not less than 90 mass % and not greater than 98 mass %, further preferably not less than 90 mass % and not greater than 97 mass %. As long as the object of the present invention is not impaired, the raw material powder may contain powder other than the Al compound powder.

The binder is added in the slurry for the purpose of improving moldability of the raw material powder, and the like. Examples of the binder include hydrophilic binders such as polyvinyl alcohol, aqueous acrylic resin, gum Arabic, and dextrin. These may be used singly or in combination of two or more types.

The blending amount of the binder is not limited in particular as long as the object of the present invention is not impaired, and is blended, for example, in a proportion of 1 part by mass to 10 parts by mass and preferably in a proportion of 3 parts by mass to 7 parts by mass, with respect to 100 parts by mass of the raw material powder.

The solvent is used for the purpose of, for example, dispersing the raw material powder and the like. Examples of the solvent include water and alcohol. These may be used singly or in combination of two or more types.

The blending amount of the solvent is not limited in particular as long as the object of the present invention is not impaired, and is blended, for example, in a proportion of 23 parts by mass to 40 parts by mass and preferably in a proportion of 25 parts by mass to 35 parts by mass, with respect to 100 parts by mass of the raw material powder. A component other than the raw material powder, the binder, and the solvent may be blended as necessary in the slurry. For mixing the slurry, a known stirring/mixing device or the like can be used.

<Deaeration Step>

A deaeration step may be performed as necessary on the slurry after the slurry production step. In the deaeration step, for example, a container holding the slurry after the mixing (kneading) is disposed in a vacuum deaeration device, and pressure reduction is performed so that the container is in a low atmospheric pressure environment, whereby bubbles contained in the slurry are removed. Through comparison of the density of the slurry before and after the deaeration, the amount of bubbles in the slurry can be grasped.

<Granulation Step>

The granulation step is a step of producing spherical granulated powder from the slurry containing the raw material powder and the like. The method for producing granulated powder from the slurry is not limited in particular as long as the object of the present invention is not impaired, and an example thereof is a spray-dry method. In the spray-dry method, the slurry is spray-dried by using a predetermined spray-dryer device, whereby granulated powder having a predetermined particle diameter can be obtained. The particle diameter of the granulated powder is not limited in particular as long as the object of the present invention is not impaired, and, for example, 212 μm pass≥95% or lower is preferable, and 180 μm pass≥95% or lower is more preferable.

<Molding Step>

The molding step is a step of obtaining a molded body by molding the granulated powder into a predetermined shape with use of a mold. The molding step is performed through rubber press molding, die press molding, or the like. In the case of the present embodiment, the pressure (pressure increase rate in pressing) to be applied from the outer peripheral side to the mold (e.g., an inner rubber mold and an outer rubber mold of a rubber press molding machine) is adjusted so as to be increased stepwise. It is preferable that the adjustment is performed in a range (e.g., not less than 100 MPa) of higher pressure than conventional art. The upper limit value of the pressure is not limited in particular as long as the object of the present invention is not impaired, and may be adjusted, for example, to not greater than 200 MPa.

<Grinding Step>

The grinding step is a step of removing the machining allowance of the molded body obtained after the molding step, polishing the surface of the molded body, and the like. In the grinding step, removal of the machining allowance, polishing of the surface of the molded body, and the like are performed through grinding with a resinoid grinding wheel or the like. Through this grinding step, the shape of the molded body is adjusted.

<Sintering Step>

The sintering step is a step of obtaining an insulator by sintering the molded body of which the shape has been adjusted in the grinding step. In the sintering step, for example, sintering is performed in an air atmosphere at not less than 1450° C. and not greater than 1650° C. for 1 to 8 hours. After the sintering, the molded body is cooled, whereby the insulator 2 made from the alumina-based sintered body is obtained.

Using the insulator 2 obtained as described above, the spark plug 1 of the present embodiment is manufactured. The components other than the insulator 2 of the spark plug 1 are similar to known components as described above.

Hereinafter, the present invention will be described in further detail, based on Examples. It should be noted the present invention is not limited in any way by these Examples.

Example 11

(Production of Test Sample)

Insulators (three in total) of which the basic configuration was the same as that of the insulator of the spark plug described as an example in the first embodiment above were produced by a manufacturing method similar to that in the first embodiment above. The thickness of the middle trunk portion of the insulator was 3 mm. In the slurry production step, when raw material powder was milled by a wet milling machine, cobbles (ϕ3 mm) having a diameter of 3 mm and cobbles (ϕ10 mm) having a diameter of 10 mm were used in proportions of 50 mass % and 50 mass %, respectively.

(Measurement of Normal Temperature Withstand Voltage)

An insulator having mounted therein a bar-like center electrode body was assembled to a metal shell to produce a test sample. The test sample was set in a high-pressure chamber, and in a state where carbon dioxide gas ($CO_2$) was supplied at a pressure of about 5 MPa in the high-pressure chamber, voltage was applied at an increase rate of 0.1 kV/sec from the front end portion of the center electrode body of the test sample. Earthing (grounding) at that time was provided through the metal shell. The breakdown voltage at penetration of the insulator was measured. The results are shown in Table 1.

(Measurement of Alkaline Corrosion Withstand Voltage)

In order to measure the alkaline corrosion withstand voltage, an insulator having been processed in advance was prepared. Specifically, insulation processing was performed in advance to the periphery of the leg portion such that, when a center electrode body was mounted to the inside of the insulator, the front end of the center electrode body was not exposed from the leg portion and the thickness of the leg portion was substantially constant. Then, the insulator having mounted therein the bar-like center electrode body with the opening at the front end of the insulator closed was assembled to a metal shell to produce a test sample. In order to suppress concentration of electric fields to the front end of the center electrode body, the front end of the center electrode body was rounded. The test sample was set in a heating furnace kept at about 200° C., and a voltage of 35 kV was applied for 100 hours from a front end portion of the center electrode body of the test sample. Earthing (grounding) at that time was provided through the metal shell. By continuously applying the voltage to the insulator of the test sample in this manner, without causing discharge to the outside, electric field concentration was caused at a predetermined place (the portion opposed to the electrode flange portion (diameter-enlarged portion) in the radial direction) of the middle trunk portion of the insulator, whereby alkaline corrosion of the predetermined place was forcibly caused. The presence or absence of alkaline corrosion can be determined by measuring the presence or absence of an alkali metal such as Na or an alkaline-earth metal with respect to the insulator, by using an electron beam probe microanalyzer (EPMA).

Then, using the insulator having undergone alkaline corrosion, the breakdown voltage at penetration of the insulator was measured by a method similar to that in "measurement of normal temperature withstand voltage" described above. The results are shown in Table 1.

(Observation 1 of Cut Surface (Mirror-Polished Surface) of Middle Trunk Portion)

With respect to the obtained insulator, the insulator was cut in a direction perpendicular to the axial line direction, at a position separated by 2 mm from the portion having the maximum diameter of the electrode flange portion (diameter-enlarged portion) of the center electrode to the rear end side along the axial line direction. Then, the obtained cut surface of the insulator was polished into a mirror state, and the structure of the cut surface (mirror-polished surface) was observed by an SEM (model "JSM-IT300LA" manufactured by JEOL Ltd.). The acceleration voltage of the SEM was set to 20 kV, and the magnification of the SEM was set to 500 times. Then, in the cut surface (mirror-polished surface), 20 first observation regions X each being 192 μm×255 μm were set so as to each overlap the reference position being the position 0.2 mm in the radial direction from the inner peripheral surface side of the insulator and so as not to overlap each other. Then, 20 SEM images in total corresponding to the 20 first observation regions were acquired. Then, with respect to the SEM images, image analysis processing was executed by image analysis software (WinROOF (registered trademark) manufactured by MITANI CORPORATION), whereby the proportion (porosity) of the area of all of the pores included in the 20 first observation regions X relative to the total area (100%) of the 20 first observation regions X was obtained. The results are shown in Table 1.

Further, the number of pores included in the 20 first observation regions in the cut surface (mirror-polished surface) was measured through image analysis processing. The results are shown in Table 1.

(Observation 2 of Cut Surface (Thermally Etched Surface) of Middle Trunk Portion)

In a state of being placed in a predetermined electric furnace, the above insulator including the mirror-polished surface was held for one hour at 1400° C. and then allowed to cool in the electric furnace. In this manner, thermal etching was performed on the mirror-polished surface of the test sample. The obtained cut surface (thermally etched surface) of the test sample was observed by the SEM. The acceleration voltage of the SEM was set to 20 kV, and the magnification of the SEM was set to 3000 times.

Then, in the cut surface (thermally etched surface), 20 second observation regions Y each being 32 μm×43 μm were set so as to each overlap the reference position being the position 0.2 mm in the radial direction from the inner peripheral surface side of the insulator and so as not to overlap each other, and 20 SEM images in total corresponding to the 20 second observation regions Y were acquired. Then, using the SEM images, image analysis processing according to JIS G0551 "ferritic or austenitic grain size measurement" was performed, whereby the particle diameter of each alumina particle in the 20 second observation regions Y was measured. Then, using the measurement result of the particle diameter of the alumina particles, the average particle diameter A of the alumina particles was obtained. The results are shown in Table 1.

In addition, the value [μm] of (A+3σ) when the particle size distribution of alumina particles included in the 20 second observation regions was regarded as a normal distribution, and the standard deviation of the particle diameter of the alumina particles was defined as σ, was obtained. The results are shown in Table 1.

With respect to each alumina particle included in the 20 second observation regions, the long diameter and the short diameter of the alumina particle were measured by an intercept method. Then, for each second observation region, top three alumina particles having the largest long diameters, out of the measured long diameters of the respective alumina particles, were selected, to select 60 alumina particles in total having large long diameters as the representative alumina particles.

With respect to each of the selected 60 representative alumina particles, the aspect ratio (d1/d2) was obtained on the basis of the long diameter and the short diameter thereof. With respect to the selected 60 representative alumina particles, the average aspect ratio B was obtained. The results are shown in Table 1.

Then, the value of (B+3σ) when the frequency distribution of the aspect ratio of the 60 representative alumina particles was regarded as a normal distribution and the standard deviation of the aspect ratio of the representative alumina particles was defined as σ, was obtained. The results are shown in Table 1.

With respect to the 60 representative alumina particles, the number of representative alumina particles of which the aspect ratio was not less than 3.5 was counted. The results are shown in Table 1.

Examples 2 to 91

Insulators of Examples 2 to 9 were produced in a similar manner to that in Example 1, except that, in the slurry production step, the ratio of cobbles to be used in milling the raw material powder was changed as appropriate.

Comparative Example 1

An insulator of Comparative Example 1 was produced in a similar manner to that in Example 1, except that, in the slurry production step, when the raw material powder was milled by a wet milling machine, cobbles (ϕ3 mm) having a diameter of 3 mm, cobbles (ϕ10 mm) having a diameter of 10 mm, and cobbles (ϕ30 mm) having a diameter of 30 mm were used in proportions of 10 mass %, 40 mass %, and 50 mass %, respectively.

Comparative Examples 2 to 41

Insulators of Comparative Examples 2 to 4 were produced in a similar manner to that in Comparative Example 1, except that, in the slurry production step, the ratio of cobbles to be used in milling the raw material powder was changed as appropriate.

With respect to the obtained insulators, "measurement of normal temperature withstand voltage", "measurement of alkaline corrosion withstand voltage", "observation 1 of cut surface (mirror-polished surface) of middle trunk portion", and "observation 2 of cut surface (thermally etched surface) of middle trunk portion" described above were performed, as in Example 1. The results are shown in Table 1.

TABLE 1

| | PORE | | ALUMINA PARTICLE | | REPRESENTATIVE ALUMINA PARTICLE | | | NORMAL TEMPER- | ALKALINE |
|---|---|---|---|---|---|---|---|---|---|
| | POROSITY (%) | NUMBER OF PORES (NUMBER) | AVERAGE PARTICLE DIAMETER A (μm) | A + 3σ (μm) | AVERAGE ASPECT RATIO B | B + 3σ | ASPECT RATIO OF NOT LESS THAN 3.5 (NUMBER) | ATURE WITHSTAND VOLTAGE (kV) | CORROSION WITHSTAND VOLTAGE (kV) |
| EXAMPLE 1 | 2.6 | 935 | 1.9 | 2.5 | 2.2 | 4.0 | 0 | 41 | 36 |
| EXAMPLE 2 | 2.5 | 345 | 2.8 | 3.0 | 2.6 | 3.8 | 0 | 40 | 38 |
| EXAMPLE 3 | 2.6 | 332 | 2.2 | 3.0 | 2.7 | 4.0 | 1 | 41 | 38 |
| EXAMPLE 4 | 2.4 | 398 | 2.2 | 2.7 | 2.5 | 4.8 | 2 | 41 | 38 |
| EXAMPLE 5 | 2.8 | 343 | 2.0 | 2.7 | 2.7 | 5.1 | 3 | 40 | 32 |
| EXAMPLE 6 | 2.8 | 350 | 2.0 | 2.7 | 2.4 | 4.0 | 3 | 40 | 33 |
| EXAMPLE 7 | 2.6 | 600 | 2.1 | 2.5 | 2.3 | 3.9 | 1 | 41 | 38 |
| EXAMPLE 8 | 2.6 | 843 | 2.1 | 2.5 | 2.3 | 3.9 | 1 | 41 | 35 |
| EXAMPLE 9 | 3.5 | 935 | 1.9 | 2.5 | 2.3 | 4.0 | 0 | 41 | 36 |
| COMPARATIVE EXAMPLE 1 | 2.6 | 250 | 3.5 | 5.5 | 2.9 | 3.9 | 1 | 34 | 30 |
| COMPARATIVE EXAMPLE 2 | 2.6 | 1125 | 1.7 | 2.7 | 2.3 | 3.8 | 0 | 41 | 30 |
| COMPARATIVE EXAMPLE 3 | 2.7 | 354 | 2.2 | 4.0 | 2.5 | 3.8 | 1 | 41 | 30 |
| COMPARATIVE EXAMPLE 4 | 4.0 | 935 | 1.9 | 2.6 | 2.4 | 4.4 | 0 | 34 | 30 |

As shown in Table 1, Examples 1 to 9 were excellent in the results of the normal temperature withstand voltage and the alkaline corrosion withstand voltage when compared with those of Comparative Examples 1 to 4.

Examples 1 to 4 and Examples 6 to 9 out of Examples 1 to 9 were excellent in the results of the normal temperature withstand voltage and the alkaline corrosion withstand voltage when compared with those of Example S.

Examples 1 to 4 and Examples 7 to 9 out of Examples 1 to 9 were excellent in the results of the normal temperature withstand voltage and the alkaline corrosion withstand voltage when compared with those of Examples 5, 6.

In particular, Examples 2 to 4 and Example 7 out of Examples 1 to 4 and Examples 7 to 9 were excellent in the result of the alkaline corrosion withstand voltage.

EXPLANATION OF SYMBOLS

1: spark plug
2: insulator
21: through-hole
22: leg portion
23: middle trunk portion
230: cut surface
230*a*: mirror-polished surface
230*b*: thermally etched surface
24: flange portion
25: rear-side tube portion
26: first diameter-enlarged portion
27: second diameter-enlarged portion
3: center electrode
31: center electrode body
31*a*: electrode flange portion (diameter-enlarged portion)
31*b*: electrode head portion
31*c*: electrode leg portion (electrode body portion)
4: ground electrode
5: metal terminal
6: metal shell
7: resistor
8: seal member
9: seal member
11: pore
AX: axial line
X: first observation region
Y: second observation region

What is claimed is:

1. A spark plug comprising:

an insulator having a tubular shape extending along an axial line direction thereof and made from an alumina-based sintered body;

a center electrode including an electrode body portion having a bar-like shape inserted in the insulator such that a front end of the electrode body portion is exposed from the insulator and a rear end of the electrode body portion is housed inside the insulator, and a diameter-enlarged portion continuous to the rear end of the electrode body portion, having a shape enlarged in a radial direction from the electrode body portion, and engaged with an inner wall of the insulator; and a conductive sealing material housed inside the insulator and provided on the rear end side of the center electrode, wherein in a mirror-polished surface obtained by mirror-polishing a cut surface obtained by cutting the insulator in a direction perpendicular to the axial line direction, at a position separated by 2 mm from a portion having a maximum diameter of the diameter-enlarged portion to the rear end side along the axial line direction, when 20 first observation regions each being 192 μm×255 μm are set so as to each overlap a reference position being a position 0.2 mm in the radial direction from an inner peripheral surface side of the insulator and so as not to overlap each other, a porosity of an area of all of pores included in the 20 first observation regions relative to a total area (100%) of the 20 first observation regions is not greater than 3.5%, and in a thermally etched surface obtained by subjecting the mirror-polished surface to thermal etching, when 20 second observation regions each being 32 μm×43 μm are set so as to each overlap the reference position and so as not to overlap each other, a particle size distribution of alumina particles included in the 20 second observation regions is regarded as a normal distribution, an average particle diameter of the alumina particles is defined as A, and a standard deviation of a particle diameter of the alumina particles is defined as σ, A is not less than 1.9 μm and not greater than 2.8 μm, and (A+3σ) is not greater than 3.0 μm.

2. The spark plug according to claim 1, wherein, in the 20 second observation regions in the thermally etched surface, when top three alumina particles having the largest long diameters are selected for each second observation region, to select 60 representative alumina particles having large long diameters, a frequency distribution of an aspect ratio of the representative alumina particles is regarded as a normal distribution, an average aspect ratio of the representative alumina particles is defined as B, and a standard deviation of the aspect ratio of the representative alumina particles is defined as σ, (B+3σ) is not greater than 4.8.

3. The spark plug according to claim 2, wherein, in the 20 second observation regions in the thermally etched surface, out of the representative alumina particles, the number of representative alumina particles of which the aspect ratio is not less than 3.5 is not greater than two.

4. The spark plug according to claim 1, wherein, in the 20 first observation regions in the mirror-polished surface, the number of the pores is not greater than 600.

* * * * *